UNITED STATES PATENT OFFICE.

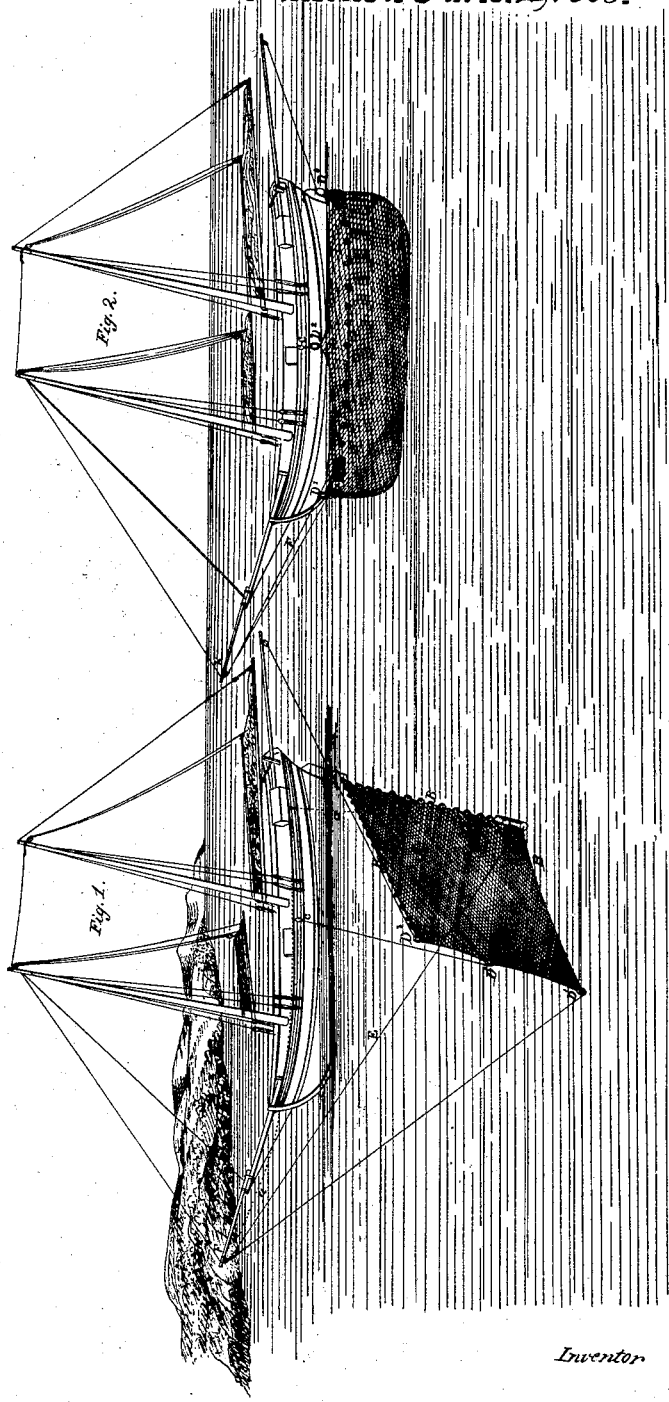

BENJN. W. HALE, OF NEWBURY, MASSACHUSETTS.

IMPROVEMENT IN THE NET FOR CATCHING MACKEREL AND OTHER FISH AT SEA OR IN DEEP WATER.

Specification forming part of Letters Patent No. 763, dated June 4, 1838.

*To all whom it may concern:*

Be it known that I, BENJAMIN W. HALE, of Newbury, in the county of Essex and State of Massachusetts, have invented a new and Improved Mode of Taking Mackerel and other Fish at Sea or in Deep Water; and I do hereby declare that the following is a full and exact description of my improvement, reference being had to the annexed drawings, and making part of this specification, that will enable others skilled in the art of fishing to make, understand, and use the same.

The net A, Figure 1, is of a square or oblong form, varying in length and depth according to the size of the vessel from which it is to be used and at the pleasure of those making use of it, a proper length for a vessel of fifty to sixty tons being from fifteen to twenty fathoms.

Three of the four sides, B B B, Fig. 1, are sufficiently buoyed or corked to support them on the surface of the water and prevent any fish which may be inclosed from escaping over the top of the net.

At the end of the net, which is the farthest removed from the vessel a log buoy, C, Fig. 1, of from twelve to fourteen inches in length upon the upper horizontal cork-line is attached, the under side of which is sufficiently ballasted (similar to a vessel's log-chip) to make it swim in a vertical position, for the purpose of spreading the net.

The fourth side of the net at the corners and at the center has weights of lead $D'$ $D^2$ $D^3$, Fig. 1, or other heavy material attached of sufficient gravity to cause the net to assume a vertical position when spread in the water.

A bag may be attached to the net at or near the center, into which any fish that are taken may be immediately shot, detaching the same and replacing it by another.

To make use of the net, a line, E, Fig. 1, is attached to the buoy C, Fig. 1, by a short span or bight, similar to the band attaching the twine to a kite. This line is rove through a leading-block upon the end of the bowsprit or jib-boom F, Fig. 1, and brought inboard and made fast. This line may be overhauled, and the bight (shown by dotted lines) taken to the most convenient part of the vessel to preserve the right-angular position of the net with the vessel and to prevent the least obstruction to the approach of fish.

Three other lines are attached to the net at the points $D'$ $D^2$ $D^3$, Fig. 1. That at $D'$, Fig. 1, is rove through a leading-block or eye at $b$ and brought inboard, that at $D^2$, Fig. 1, leading inboard at $c$, and that at $D^3$, Fig. 1, leading through a block or eye on an outrigger astern, and thus brought inboard.

All the lines are of sufficient length to admit of the nets lying at a proper distance and angle from the vessel.

When a school of mackerel approaches the vessel, and is in a proper situation, the bight of the line $d$, Fig. 1, is cast off and hauled in from the end of the bowsprit or jib-boom F, Fig. 1, so as to cause the net to ride parallel with the side of the vessel. The three bottom lines attached at $D'$ $D^2$ $D^3$, Fig. 1, are then drawn in, the weights operating to force the bottom of the net toward the side of the vessel, and ceasing to operate to sink the two vertical or cork lines, and they rise simultaneously with the bottom line to the surface of the water, thus inclosing whatever may continue in the space occupied by the net, as seen at Fig. 2.

What I claim as my invention, and not previously known or used, and for which I desire Letters Patent, is—

The application of buoys or corks to the ends of the net for supporting them on the surface of the water when the weights are drawn up, and also the application of the lines leading from the weights at the bottom of the net through the blocks or eyes at the outriggers and inboard, all being constructed and operating substantially as above described.

B. W. HALE.

Witnesses:
CHARLES HALE,
M. W. DRESSER.